US009264942B2

(12) United States Patent
Sarkar et al.

(10) Patent No.: US 9,264,942 B2
(45) Date of Patent: Feb. 16, 2016

(54) SYSTEMS AND METHODS FOR MANAGING QUALITY OF SERVICE

(75) Inventors: Nilanjan Sarkar, Bangalore (IN); Beny Haddad, Jerusalem (IL)

(73) Assignee: Sandvine Incorporated ULC, Waterloo, Ontario, CA (US)

( * ) Notice: Subject to any disclaimer, the term of this patent is extended or adjusted under 35 U.S.C. 154(b) by 228 days.

(21) Appl. No.: 13/402,621

(22) Filed: Feb. 22, 2012

(65) Prior Publication Data

US 2013/0170350 A1 Jul. 4, 2013

(30) Foreign Application Priority Data

Dec. 30, 2011 (IN) .......................... 3885/DEL/2011

(51) Int. Cl.
*H04L 5/12* (2006.01)
*H04W 28/24* (2009.01)

(52) U.S. Cl.
CPC .................................... *H04W 28/24* (2013.01)

(58) Field of Classification Search
USPC ......................................... 370/235; 709/230
See application file for complete search history.

(56) References Cited

U.S. PATENT DOCUMENTS

| 8,817,751 | B2* | 8/2014 | Zhang | H04W 36/0022 370/332 |
| 2005/0190755 | A1* | 9/2005 | Singh et al. | 370/389 |
| 2007/0204050 | A1* | 8/2007 | Liu et al. | 709/230 |
| 2008/0031159 | A1 | 2/2008 | Jokinen | |
| 2008/0132269 | A1* | 6/2008 | Shen et al. | 455/550.1 |
| 2008/0254768 | A1* | 10/2008 | Faccin | H04W 76/02 455/411 |
| 2009/0252148 | A1 | 10/2009 | Dolganow et al. | |
| 2010/0067400 | A1 | 3/2010 | Dolganow et al. | |
| 2010/0118892 | A1 | 5/2010 | Nguyen et al. | |
| 2010/0260129 | A1* | 10/2010 | Ulupinar | H04L 21/4633 370/329 |
| 2010/0265823 | A1 | 10/2010 | Zhao et al. | |
| 2011/0075675 | A1* | 3/2011 | Koodli | H04L 12/14 370/401 |
| 2011/0103310 | A1* | 5/2011 | Stojanovski | H04L 12/66 370/328 |

(Continued)

FOREIGN PATENT DOCUMENTS

WO 20100112077 A1 10/2010

OTHER PUBLICATIONS

3rd Generation Partnership Project; Technical Specification Group Core Network and Terminals—Policy and Charging Control signalling flows and Quality of Service (QoS) parameter mapping (Release 11), Sep. 2011.

(Continued)

*Primary Examiner* — Asad Nawaz
*Assistant Examiner* — Syed S Ali
(74) *Attorney, Agent, or Firm* — Z IP Law PLLC

(57) ABSTRACT

A method for managing quality of service (QoS) consists of receiving a packet and identifying at least one application level characteristic of the packet. The method for managing QoS further consists of modifying quality of service parameters of the packet based on the application level characteristic and sending the packet to a destination with modified quality of service parameters. A system for managing QoS includes modules such as a bearer module adapted to review and retrieve data from a packet and a payload packet inspector module adapted to identify at least one application level characteristic of the packet. The system for managing QoS further has a policy enforcement module designed to modify quality of service parameters of the packet based in part on the retrieved data and the at least one application level characteristic.

17 Claims, 10 Drawing Sheets

(56) References Cited

U.S. PATENT DOCUMENTS

| | | | |
|---|---|---|---|
| 2011/0141890 A1* | 6/2011 | Giaretta | H04W 28/20 370/232 |
| 2011/0171953 A1* | 7/2011 | Faccin | H04W 48/08 455/426.1 |
| 2011/0194535 A1 | 8/2011 | Johansson et al. | |
| 2011/0320608 A1* | 12/2011 | Nelakonda | H04L 12/00 709/226 |
| 2012/0082033 A1* | 4/2012 | Pongracz et al. | 370/235 |
| 2012/0082073 A1* | 4/2012 | Andreasen et al. | 370/310 |
| 2012/0263089 A1* | 10/2012 | Gupta | H04W 72/005 370/312 |
| 2013/0021932 A1* | 1/2013 | Damnjanovic | H04W 52/0229 370/252 |
| 2013/0111520 A1* | 5/2013 | Lo | H04L 67/306 725/35 |
| 2013/0114415 A1* | 5/2013 | Das et al. | 370/238 |
| 2013/0287023 A1* | 10/2013 | Bims | 370/389 |

OTHER PUBLICATIONS

European Patent Office, European Search Report and Annex dated Apr. 13, 2012, European Appln No. 12156549, Hague, Netherlands.
European Patent Office, Office Action for European Patent App. No. 12156549.3, Mar. 16, 2015.

* cited by examiner

SYSTEMS AND METHODS FOR MANAGING QUALITY OF SERVICE

FIELD

The present disclosure relates generally to management of network traffic. More particularly, the present disclosure relates to systems and methods for managing quality of service in networks.

BACKGROUND

Long Term Evolution (LTE) networks are a standard type of network for wireless communication of high-speed data. LTE networks are based upon previous network technologies and are now used by many wireless carriers in North America and around the world. LTE networks are intended to have end-to-end quality of service (QoS) metrics.

In LTE networks, the quality of service data is provided on Evolved Packet Core Services (EPS) bearers. An EPS bearer is a virtual connection between a user's network equipment and a Packet Data Network Gateway (PGW).

An EPS bearer is characterized by:

- A set of QoS parameters, often referred to as a QoS Class Index (QCI), which describe the type of service using EPS bearer. Types of service include, for example, conversational voice, streaming video, signaling, best effort, etc. Inside each EPS node, for example, the Packet Data Network Gateway (PGW), the Serving Gateway (SGW), eNodeB, and the like, the QCI points to more detailed pre-configured QoS attributes, for example, maximum delay, residual error rate, etc. These QoS attributes characterize the type of transport service provided by the EBS bearer;
- A flow specification that describes the maximum bitrate (MBR) and/or guaranteed bitrate (GBR) of the aggregate traffic flow through the EBS bearer; and
- A filter specification that describes the traffic flows, in terms of Internet Protocol (IP) addresses, protocols, port numbers, etc., for which the transport service is provided between the two endpoints.

However, conventional traffic differentiation in LTE networks is basic and based on classification criteria of Internet Protocol (IP) 5 tuples (5 main fields that are used to differentiate IP packets). This conventional traffic differentiation does not necessarily match today's applications. Generic classification techniques based on Destination IP address, Source IP address, Source or Destination Ports, or IP protocol, etc. are limited in their ability to differentiate traffic as the inspection of the packets is limited to the IP and Transmission Control Protocol (TCP) or User Datagram Protocol (UDP) headers only. The conventional approach is too limited because many protocols (and therefore types of service) of interest to LTE network operators utilize arbitrary ports, may automatically change port numbers and may shift between TCP and UDP protocol.

It is, therefore, desirable to provide improved systems and methods for managing network traffic and quality of service of network traffic.

SUMMARY

In a first aspect, the present disclosure provides a method for managing quality of service consisting of: receiving a packet; identifying at least one application level characteristic of the packet; modifying quality of service parameters of the packet based on the application level characteristic; and sending the packet to a destination with modified quality of service parameters.

In some cases, the method for managing quality of service of modifies the quality of service parameters by sending the packet to a destination with a different bearer.

In some cases, the method for managing quality of service of modifies the quality of service parameters by modifying the tunnel endpoint identification of the packet and/or by modifying the Differentiated Services Code Point (DSCP) of the packet.

In some cases, the method for managing quality of service creates a new bearer with pre-determined quality of service parameters. The method may also create a bearer table of available bearers.

In some cases, the method for managing quality of service further consists of identifying policy conditions of the packet; and further modifying the quality of service parameters of the packet based on the retrieved policy conditions.

In some cases, the method for managing quality of service of identifies the at least one application level characteristic of the packet through the use of deep packet inspection (DPI).

In some cases, the method for managing quality of service further determines the type of data within the packet after identifying the application level protocol.

In some cases, the method of managing quality of service of modifies the quality of service parameters of the packet by determining a tier level of the user and prioritizing the packet based on the tier level.

In another aspect, there is provided a system for managing quality of service (QoS) including: a bearer module adapted to review and retrieve data from a packet; a payload packet inspector module adapted to identify at least one application level characteristic of the packet; and a policy enforcement module designed to modify quality of service parameters of the packet based in part on the retrieved data and the at least one application level characteristic.

In some cases, the system for managing quality of service also includes a flow policy determination module designed to determine if a policy is applicable to the packet. In some cases the flow policy determination module can access the bearer map table and trigger a new bearer creation.

In some cases, the bearer module of the system for managing quality of service has a General Packet Radio Service Tunneling Protocol-Control (GTP-C) message parsing sub-module adapted to parse and detect QoS parameters and user information from a GTP-C message.

In some cases, the bearer module further includes a create new session table sub-module designed to create a new session bearer map table for a subscriber with the QoS elements and subscriber information retrieved by the GTP-C message parsing sub-module. In some further cases, the bearer module also includes a modify session table sub-module adapted to modify the session bearer map table with amended QoS parameters and user information.

In some cases, the policy enforcement module of the system includes a tunnel endpoint identification (TEID) replacement sub-module designed to replace an original TEID of a packet with a new TEID referring to a tunnel having different QoS parameters than the original tunnel. In some cases, the policy enforcement module further includes a Differentiated Services Code Point (DSCP) recalculation sub-module to modify the DSCP of the packet if the TEID has been modified.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides methods and systems for managing quality of service (QoS): in networks management of QoS allows for and is used to implement traffic differentiation. QoS may accomplish traffic differentiation by using multiple EPS bearers with configuration and priorities optimized to ensure sufficient service quality for the traffic flow. Conventional classification techniques based on Destination IP address, Source IP address, Source and Destination Port or IP protocol, etc. are limited in their ability as the inspection is limited to the IP header only. By using classification techniques described herein in conjunction with managing the QoS parameters, such as manipulating the bearer, the systems and methods described herein can provide a broader range of QOS for different applications.

One problem with conventional classification approach is that not all current applications use standard ports. Some applications even obfuscate themselves by using the well defined ports of other applications, for example, instant messaging applications may run over Transmission Control Protocol (TCP) port 80, which is generally used for HTTP. Hence, the transport layer (Layer 4) port mechanism of application identification is not always reliable because it relies on well defined port matching.

Classification techniques defined herein make use of deep packet inspection (DPI) for managing QoS. There are varieties of DPI techniques, such as pattern analysis or behavior analysis. The methods and systems described herein are intended to use DPI capabilities, policy conditions, such as determining time of day, congestion in the network, subscriber details, etc. and other criteria in conjunction with the advanced QoS techniques existing in LTE networks to provide an appropriate QoS for services. The QoS management systems and methods described herein are able to identify an IP flow and are intended to better optimize traffic by being located and/or administrated within the network and not at an end-point of the network. Not only can the system apply DPI, but, by being located within the network, can manage or manipulate QoS parameters. By being able to manage QoS parameters the traffic may be prioritized by data retrieved during DPI such that the traffic can continue to flow from the source to the destination with amended or reprioritized QoS parameters. The QoS management system and methods may vary by network operator since the policy conditions, types and tiers of subscribers and traffic may also vary. The systems and methods are also intended to adapt to changes in policy and usage patterns. The systems and methods described herein are adapted to provide different QoS parameters by, for example, redirecting detected application traffic to a bearer with higher or lower QoS parameter. The switching of the bearer is described in more detail herein.

Figure 1:
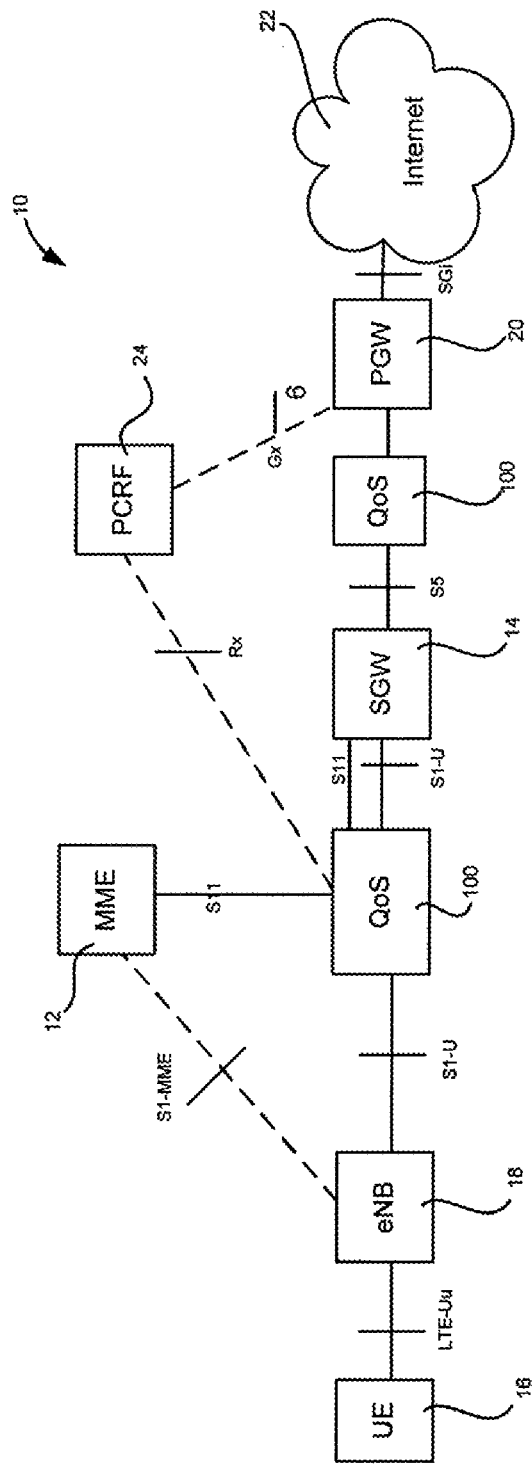
FIG. 1 is a network diagram including an example placement of a QoS management system.

FIG. 1 illustrates a network 10 such as a Long Term Evolution (LTE) network, a 3G network or the like, with the addition of a QoS management system 100. The QoS management system 100 is intended to detect specific application traffic flows and manipulate the QoS parameters by, for example, moving the associated flows to a more appropriate bearer or tunnel to match the traffic flows' QoS requirements.

The network 10 includes components such as a Mobility Management Entity (MME) 12, which is a control node for the network 10. The MME selects a Serving Gateway (SGW) 14 for a selected piece of user equipment 16. The SGW 14 routes and forwards traffic flows. The user equipment 16 or hardware is connected to an eNodeB (eNB) 18, a node that communicates directly to the user equipment 16 as user equipment 16 generally does not communicate directly with another piece of user equipment, but traffic is flowed through the network 10. The SGW 14 further communicates with a Packet Data Network Gateway (PGW) 20 that provides connectivity to an external packet data network, such as the Internet 22. The network 10 may further include a policy charging and rules function (PCRF) node 24 designed to relay policy and rules messages to the other elements of the network. The QoS management system 100 can reside on the network 10 between end points of traffic flows, and is shown in two locations in FIG. 1. Although shown in two locations, FIG. 1 is illustrating possible locations for the system and general only one such location may be needed or the system may be distributed depending on the implementation of the system. For example, the QoS management system 100 may reside on a reference point between the MME and SGW (S11), or between the eNodeB and SGW (S1U) or on a reference point that provides user plane tunneling and tunnel management between SGW and PGW (S5), for example, in an evolved packet code (EPC) network.

In mobile networks (3G, LTE) user data is carried over tunnels using a protocol named General Packet Radio Services Tunneling Protocol (GTP). GTP is composed by two sub-protocols GTP-Control (GTP-C) and GTP-User Data (GTP-U). GTP-C is the control section used to manage tunnels, which includes Creation, Deletion and modification of the tunnels and their association with EPS bearers. GTP-U is used for carrying user data within the GPRS Core Network and between the Radio Access Network and the core network. The data is carried on tunnels created by GTP-C protocol.

According to policies that may be predefined and stored in the QoS management system 100, traffic flows identified as services that should receive a different QoS treatment than they are currently receiving may be moved to another bearer or tunnel. By being located between the endpoints of the traffic flow, the QoS management system may see and inspect GTP-C traffic. The QoS management system 100 is designed to monitor and maintain accurate state of the EPS bearers created, their tunnel endpoint identification (TEID) and the QoS parameters associated with the bearers. By inspecting GTP-User Data Tunneling (GTP-U) payload, a tunneling protocol, where the end user packets are encapsulated by a GTP-U header to be carried over the EPS network, the QoS management system 100 may determine the type of application, protocol or Internet traffic, based on, for example signature analysis, flow characteristics and the like. The 5-tuple and application protocol may be input to a rule engine along with other state information such as state relating to the GTP session, state relating to the network and state relating to the environment.

If a policy is defined to reprioritize specific application traffic flows (either to increase or decrease the priority of the traffic), the QoS management system 100 may manage the QoS parameters of the EPS bearer, for example, the TEID of the GTP-U packets may be replaced with another TEID, having a higher or lower QCI, available for that user. By managing the TEID, the traffic will be moved to a different bearer identified by the other TEID, which will receive a different QoS treatment in the network.

Figure 2:
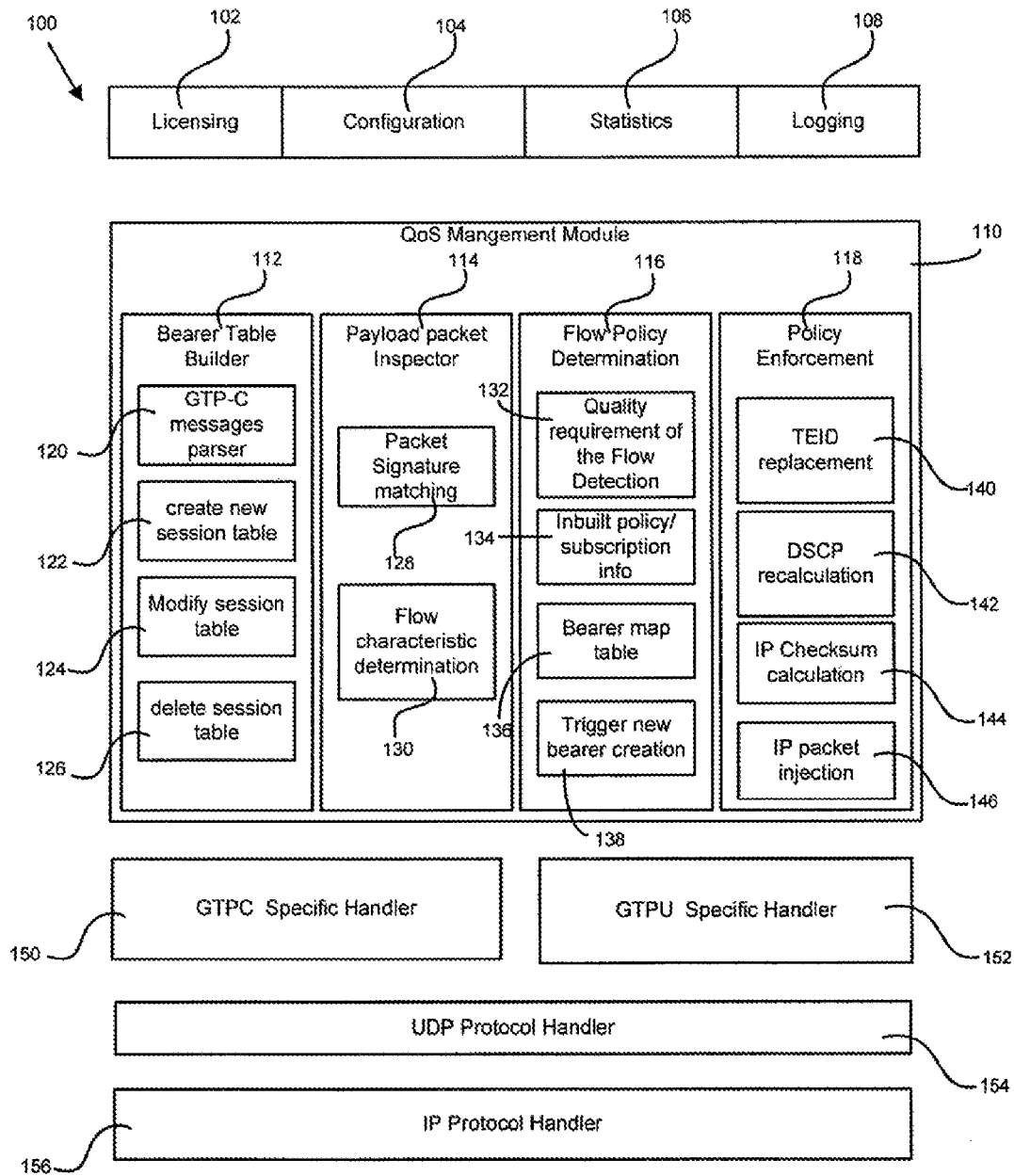
FIG. 2 illustrates an example of a QoS management system.

FIG. 2 illustrates various components that may be included as part of the QoS management system 100. The system 100 in FIG. 2 is intended for implementation in an LTE network. The QoS management system 100 may include a licensing module 102, which is adapted to enforce and enable the licensing parameters of a customer, for example, the owner of the network or a subset thereof. A configuration module 104 maintains the configuration of the system 100, such as predefined policy, subscription information, and other general system configuration information. A statistics module 106 maintains various statistics for the QoS management system 100, such as statistics on the QoS of various flows, for example, the number of tunnel switches, the number of flows that were reprioritized, packet count of prioritized flow and the like. A logging module 108 is responsible for logging functions of the QoS management system 100 like system start, down time, license expiry related information and the like. In addition the statistic module 106 may be responsible for recording policies applied to subscribers and or traffic flows for auditing purposes, for example moving flows to a different tunnel with different QoS parameters. Each of these components may contain a storage or memory component as well as a processor or the components may be operatively linked to at least one storage component and processing component. Although these modules are shown within the QoS system 100, it will be understood that they could be operatively connected to the system 100 and may reside in a separate location.

The statistics module 106 can be used for statistics or counters and can be used for new service creation purposes. For example, if the QoS system 100 may be able to review a subscriber's licensing conditions, such as the subscriber's tier of service, the QoS system may select to manage the QoS with the methods disclosed herein for applications for a premium tier subscriber than general tier subscriber. Further, the QoS system 100 may include a service definition that, for example, video gaming application for premium tier may have higher prioritized QoS parameters than video gaming applications for a general tier subscriber. The QoS system may further limit the higher prioritization by time or by amount of data flow, for example the user may have access to a higher priority bearer for free up to 1 gigabyte (GB) of data, and afterwards would have to pay extra. For example, a network operator can prepare usage base billing where a subscriber will have a package of X GB for regular flows and Y GBs for prioritized flows. The flows may be counted by Policy and Charging Enforcement Functions (PCEFs) and managed by billing systems. With new service definition that can be applied using the QoS management system 100, these services definitions can be used for billing. The QoS management system 100 may also function as a PCEF. As statistics module 106 can count flows and send data to billing system, the PCEF may be replaced or be incorporated into the QoS management system 100.

Logging Policies determined through the logging module 108 may be applied to subscribers/flows and may be used for auditing and debugging purposes. For example, if the network operator decides to apply different billing policies on Quality Of Service treatment, the QoS management system 100 may log the associated actions, for example moving flows to a different tunnel/QoS level will be logged to allow reporting of the change to the network operator. Logging may also be used to monitor license expiry by operator. By monitoring the license expire, the logging module 108 can be used to determine if there is availability to sell more licenses, allow for more bearer or tunnel switches, or monitor improved Quality of Experience (QoE) per user, for example by determining improved Round Trip Time (RTT).

The QoS management system 100 may further incorporate a QoS management module 110 that controls the system 100. The QoS management module 110 can include various components such as a bearer table builder module 112, a payload packet inspector module 114, a flow policy determination module 116 and a policy enforcement module 118. The QoS management module 110 may further contain a processor and storage component to process and store information from the sub-modules or the sub-modules may have access to separate processing and storage components.

The bearer table builder module 112 is in part responsible for building subscriber bearer information from GTP-C messages. The bearer table builder module 112 includes a GTP-C message parser 120 which is adapted to examine or detect various elements of different GTP-C messages. After the GTP-C message parser 120 parses the message, a session table creation sub-module 122 stores these elements in a subscriber session which is stored in a map table in a storage component. This bearer table may be used by the other sub-modules within the QoS management module 110. The session table creation sub-module 122 creates session tables. The bearer table builder module 112 includes a modify session table sub-module 124 designed to modify previously stored session tables. The bearer table builder may further include a deletion of session table sub-module 126 designed to delete session tables when they are no longer required, for example after receiving a delete bearer session GTP-C signaling message stating the bearer is no longer valid.

The QoS management module 110 further includes the payload packet inspector module 114, which parses the payload packet in detail to find out application level packet flow information. Application level packet flow information is used to identify application type and properites, for example, voice over IP applications such as Skype, file transfer protocol (FTP) application, etc. The payload packet inspector module 114 may include a packet signature matching sub-module 128 and a flow characteristic determination sub-module 130, both modules being used in part for the deep packet inspection (DPI) performed by the QoS management system 100. In one specific example, flows related to Youtube™ Live has the string "liveplay?sparams" in the resource field and "youtube.com" in the HOST field of an HTTP Packet associated with the flow. By identifying the packet as HTTP (based on the port) and finding these strings in the packet, it is possible to determine that this packet, as well as the following packets on the same flow, is related to Youtube, which is a video streaming application protocol. This type of flow would generally need a better QoS than other types of HTTP packets. Determining the flow through this type of signature matching allows for the QoS management system to better prioritize the flows.

The flow characteristic determination sub-module 130 determines flow characteristics such as whether the flow is conversational flow or non-conversational flow, whether video streaming or online gaming or bulk ftp flow and the like. The information on the flow characteristics is used to find what type of QCI is preferred or required for this flow, for example, jitter, latency, bandwidth requirement.

The flow policy determination module 116 is included in this example of the QoS management module 110 to identify policy requirements for identified traffic flows based on the static or dynamic information available in the system 100. The quality requirements information may be detected in a quality requirement flow detection sub-module 132. The quality requirements information may further be stored in a policy and subscription information sub-module 134 which may further include inbuilt static policy, subscription information, dynamic flow characteristic parameters, and the like. The policy and subscription information sub-module 134 may review other policy conditions such as network congestions, usage, volume, rate, subscriber information, physical location, date, time and other like information to allow the system to obtain a macro perspective of the network and the traffic flow.

Further, available bearers may be detailed in a bearer map table for that subscriber stored in a bearer map table sub-module 136. This bearer map table may have been built by the create new session table sub-module 122 with information collected in the bearer table builder module 112. This information collected in the bearer table builder module 112 may trigger the QoS management system 100 to create new bearers with the determined QCI or QoS parameter, when the required bearer is not available for the user. This new bearer can be created by a new bearer creation module 138 using, for example, a Diameter Rx message to the PCRF node 24.

The QoS management system 100 can also act as an Application Function (AF) node as defined in the Third Generation Partnership Project (3GPP) standard (see for example section 29.213 the AF session establishment section). The QoS management system, acting as an Application Function, can request new bearer creation by contacting the PCRF. The PCRF after policy evaluation will enforce the bearer creation on the network, through for example the Policy and Charging Enforcement Function (PCEF). The QoS system 100 can send, for example, a diameter AA-Request (AAR) message to the PCRF to create a new bearer with the service Information needed (for example, QCI, bandwidth requested, Flow description, etc.). The PCRF will then, for example a send Diameter Re-Authorization Request (RAR) message to the PCEF to create the new bearer up to the user equipment. In some cases, this newly created bearer may only serve for subsequent traffic. The assumption is that the current traffic will act as a trigger to create the new bearers, but it may not be possible to hold the traffic until the new bearers are created. The method for creating a new bearer is described in further detail herein.

The policy enforcement module 118 is designed to enforce the determined policy for the flow. A tunnel endpoint identification (TEID) management sub-module 140 is adapted to perform tunnel endpoint identification switching for the flow, which modifies the bearer to divert traffic to a bearer with a new TEID with different QCI than previously set. Depending on the QoS management provided to the flow, there may also be the application of a different Differentiated Services Code Point (DSCP) class in an outer IP header, based on the new QCI of the new bearer, which may be accomplished by a DSCP recalculation sub-module 142. After manipulating the IP header of the packets within the traffic flow, an IP checksum sub-module 144 recalculates a new checksum of that IP packet. An IP injection sub-module 146 feeds the modified packet back to the network.

The QoS management system 100 may further include or be operatively connected to a GTP-C specific handler module 150 which is used to identify GTP-C packets based on the specified GTP-C port. The GTP-C specific handler module 150 may pass GTP-C packets to the GTP-C message parsing sub-module 120. A GTP-U specific handler module 152 is used to identify GTP-U packets based on the GTP-U port. The GTP-U specific handler module 152 checks the message type Transport Protocol Data Unit (T-PDU) (a payload message) and without a sequence number (Radio Access Technology Handover (RAT-HO) message). These payload non RAT-HO messages are then passed to payload packet inspector module 114 for application level flow identification.

The QoS management system 100 may further include or be connected to a UDP protocol handler 154 and an IP protocol handler 156. These protocol handlers are intended to provide communications services on the network and let the QoS management system 100 send data to other devices and user equipment.

The QoS management module 110 allows the system 100 to find the associated bearer of the flow and the associated QoS parameters of the bearer. Once the available bearers are identified and stored by the bearer table builder 112 and the flow characteristics are determined by using DPI and determining other policy considerations such as time of day, congestion in the network, usage of a user, physical location of a subscriber, subscriber history, subscriber preference and the like, the system 100 can identify the appropriate QoS parameters for the flow. The QoS management system may determine these flow characteristics through the payload packet inspector module 114 and flow policy determination 116 as well as determining further characteristics such as subscriber preferences through the licensing module 102, statistics module 106 and the other modules and policy conditions from the policy and subscription information sub-module 134. Once the QoS management system has the appropriate QoS parameters for the flow, the QoS system can match the QoS parameters to the appropriate bearer by using the information stored in the bearer map table module 136. By matching the QoS parameters with the appropriate bearer, the bearer may be switched and the flow may be directed to a new bearer or tunnel.

Referring back to FIG. 1, having the QoS management system 100 located at S11 (or S5), in-line with the GTP-C interface, the QoS management system 100 is able to retrieve, review and examine the GTP-C signaling messages. By examining, or retrieving elements from the GTP-C signaling messages, the QoS management system 100, and in particular the GTP-C message parser 120 can determine the elements for the bearer table builder module 112 to build a bearer map table for a user or a user session. The LTE network 10 further includes network elements such as the MME 12, the eNodeB 18, the SGW 14, the PGW 20 and the PCRF node 24 to provide connectivity to the user equipment 16.

Figure 3:
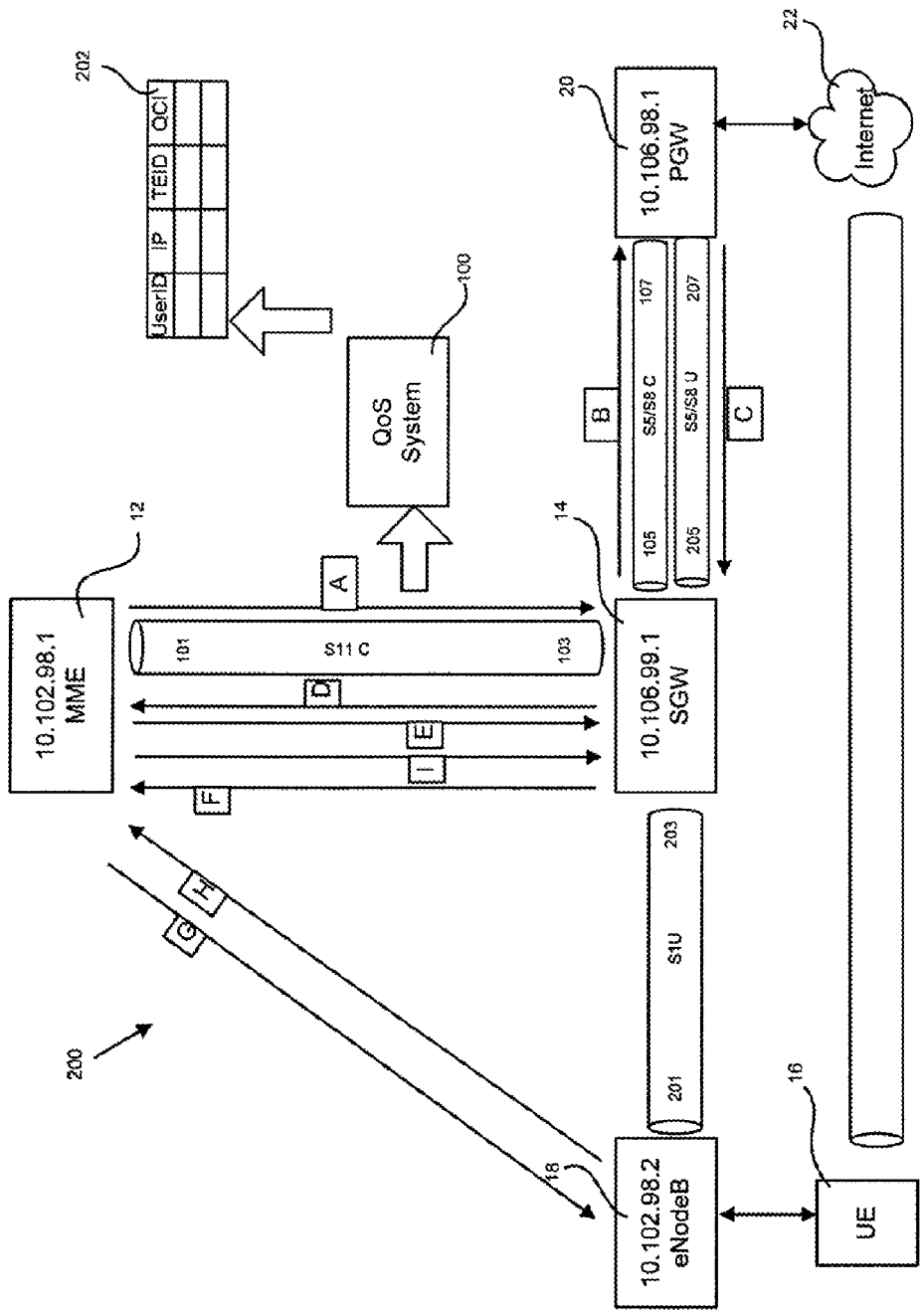
FIG. 3 illustrates building a bearer table.

FIG. 3 illustrates an example method for building a bearer map table 200 for a user. From FIG. 3, the MME 12 sends a GTP-C create session request on the S11 interface with the MME's own GTP-C TEID, for example TEID 101 to the SGW 14 (arrow A). The SGW 14 forwards this GTP-C create session request to the PGW 20 on the S5/S8 interface with its own GTP-C TEID, for example TEID 105 and GTP-U TEID, for example TEID 205 (arrow B). The PGW 20 answers with create session response to the SGW 14 on S5/S8 interface with its own GTP-C TEID, for example TEID 107 and GTP-U TEID, for example 207 (arrow C). The SGW 14 forwards the create session response to the MME 12 on S11 interface with its own GTP-C TEID, for example TEID 103, and GTP-U TEID, for example TEID 203 (arrow D). Once the MME 14 receives GTP-U TEID of eNodeB 18 on S1-U interface, the MME sends a modify bearer request to the SGW 14 on S11 interface with GTP-U TEID of eNodeB 18, for example TEID 201 (arrow E). The modify bearer response is illustrated with arrow F. The MME 12 further sends an Initial Context Set-up S1-Application Protocol (S1-AP) message to eNodeB 18 (arrow G). The message contains the TEID of the SGW 14 to be used over the S1-MME interface. The Network Access Server (NAS) message will be encapsulated in the S1-Application Protocol. The eNodeB 18 responds with Initial Context Set-up response to the MME 12 (arrow H). The response contains the TEID of eNodeB 18. The MME 12 forwards the TEID of the enodeB 18 to the SGW using the modify bearer request GTP-C message (arrow I).

Thus being at the S11 (or S5) interface, the QOS management system 100 can identify and record the bearer and corresponding tunnel endpoint identifications used for a user session. The system 100 can then build a bearer map table 202 for a user or the user session. The table may include fields such as a user identification, a user IP address that may be network assigned, and/or other identification for the user and/or the session. Further the TEIDs and associated QCIs of the bearer may also be recorded and stored in the bearer map table 202 for the user. One example of such a table is shown in Table 1 below. It will be understood that further QoS parameters or further user information may be stored in the table.

TABLE 1

| UserID | IP | TEID | QCI |
|--------|----|----|-----|
| User-A | 1.1.2.1 (Network assigned UE IP) | 201 (default bearer TEID of eNB) | 5 (non-GBR) |

If a user has more than one bearer assigned, for example a dedicated bearer with higher quality, then the table may contain multiple rows with the additional bearer information indicated by the associated TEID as shown in Table 2.

TABLE 2

| UserID | IP | TEID | QCI |
|--------|----|----|-----|
| User-A | 1.1.2.1 (Network assigned UE IP) | 201 (default bearer TEID of eNB) | 5 (non-GBR) |
|  |  | 301 (dedicated bearer TEID of eNB) | 1 (GBR) |

Figure 4:
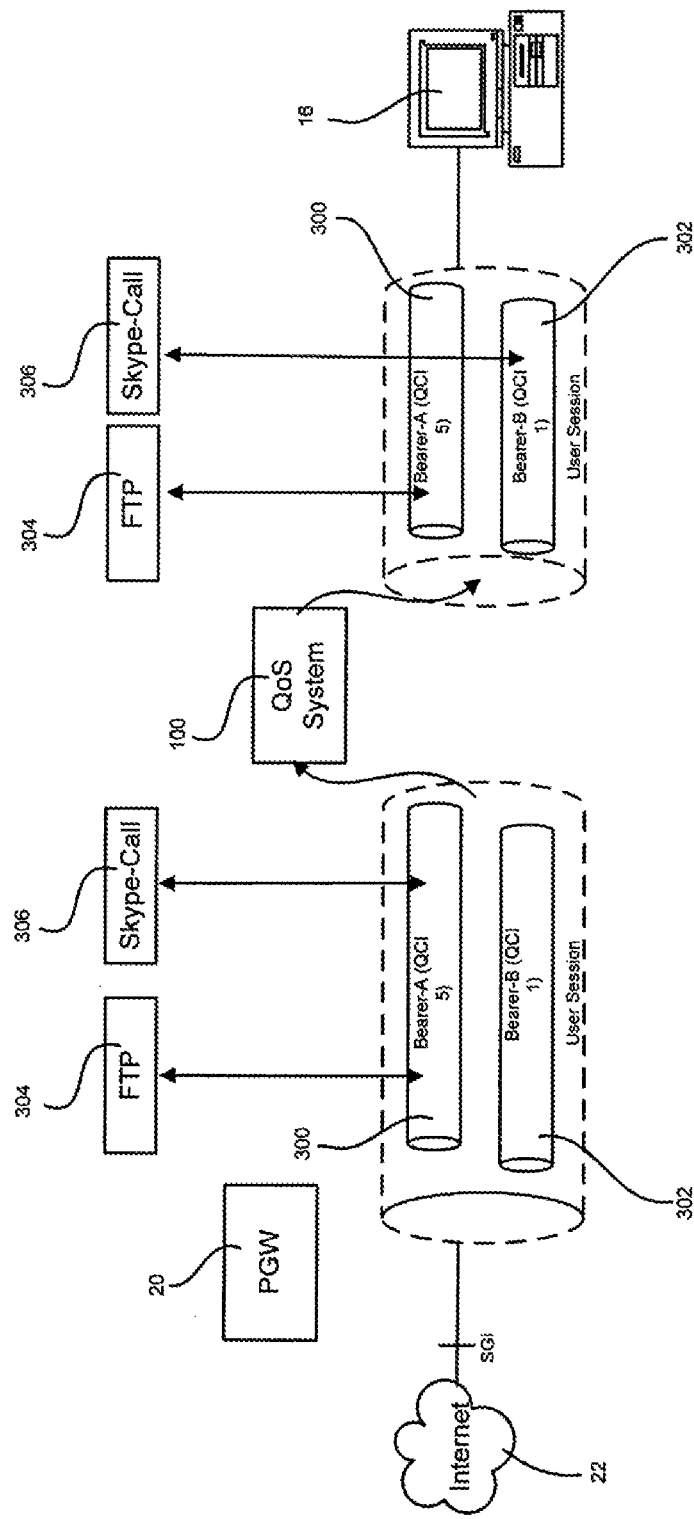
FIG. 4 illustrates an example of reprioritizing a traffic flow.

FIG. 4 is a block diagram, illustrating the process of moving a flow from a low priority bearer 300 to a high priority bearer 302. In the case of 3rd Generation Partnership Project (3GPP) defined traffic flow templates (TFT) based mechanism, it may be difficult to identify application level protocol, which does not use standard port, and therefore it may be difficult to prioritize the traffic flows. In the example shown in FIG. 5, a user may be using the Internet 22 to accomplish a file transfer through FTP 304 and may simultaneously be engaged in a call 306 through, for example, Skype™. Even if the FTP transmission is using a standard port (for example, port 21), a call through a voice over IP program such as Skype™ may also use port 21 as well. Thus the PGW 20 may be unable to distinguish the two separate data flows or traffic flows and therefore assign both traffic flows to the low priority bearer 300. Once the traffic flows are reviewed by the QoS management system 100, by using the techniques described herein such as deep packet inspection (DPI), the QoS management system 100 can identify the call flow 306 from the FTP flow 306. To provide better quality of experience to user, the QoS management system 100 can move the data flow of the call to the high quality bearer 302 from the low quality bearer 300. The QoS management system 100 can achieve this result by managing the tunnel endpoint identification (TEID) of the call data packets with the TEID of the high quality bearer 302.

Figure 5:
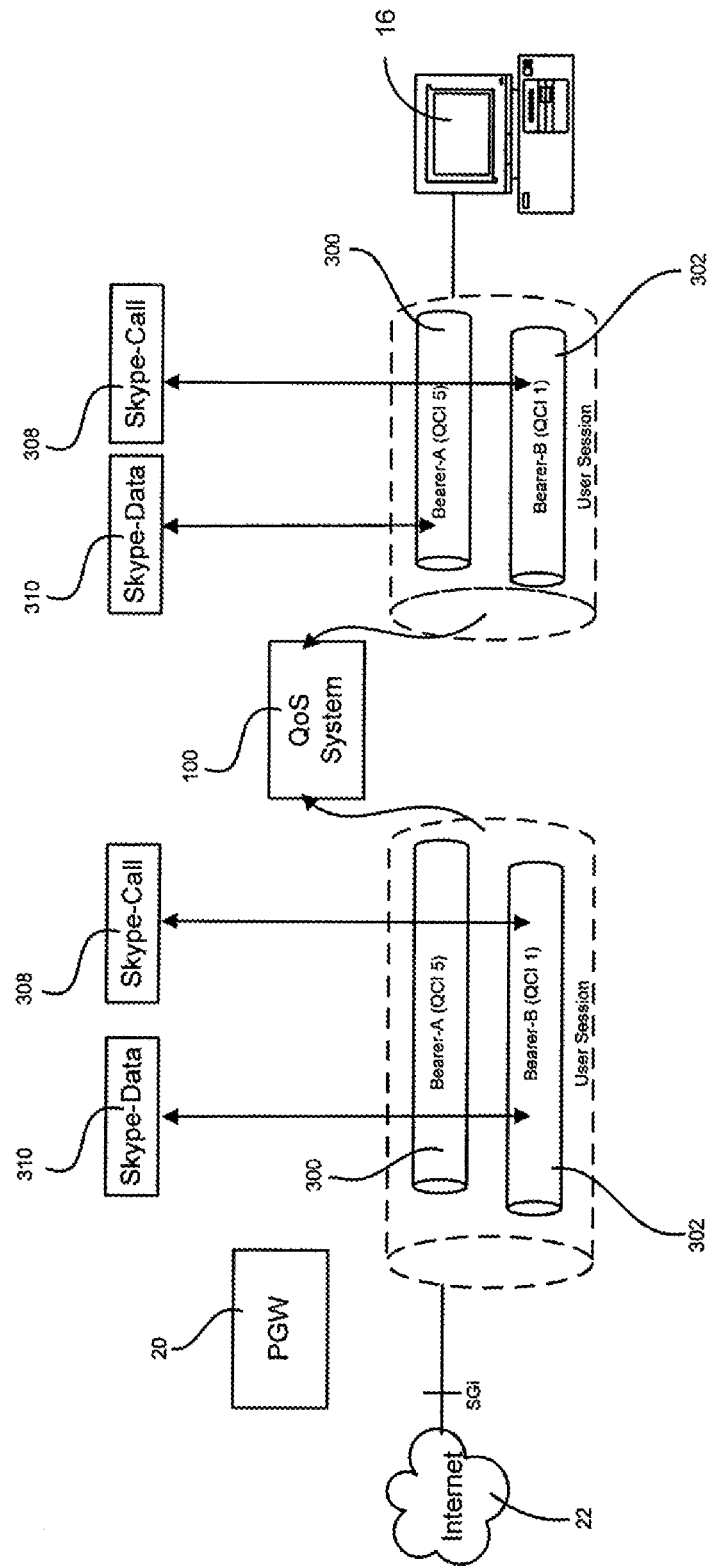
FIG. 5 illustrates another example of reprioritizing a traffic flow.

FIG. 5 is block diagram, illustrating an example process of moving a flow from the high priority bearer 302 to the low priority bearer 300. Reprioritizing flows from a high priority bearer to a low priority bearer may be useful in many scenarios for example, to reduce network congestion or to optimize radio resources by downgrading a non-conversational application flow. For example, as shown in FIG. 5, a user may be completing both a call 308 over a voice over IP program such as Skype™ but may also be using the same program to exchange data 310 for example, instant messaging or transferring data to another user. The PGW 20 may prioritize both as requiring high priority bearer 302, but on inspection by the QoS management system 100, the system may note that one flow is related to data transfer and not a call and that flow can therefore be reprioritized to the low priority bearer 300. The QoS management system 100, on determining the data of the flows, can reprioritize the data transfer 310 to the low priority bearer 300 while maintaining the call 308 on the high priority bearer 302.

Therefore, the QoS system 100 is not limited to merely detecting and managing the QoS parameters of various flows of different applications, such as conversation traffic flows over FTP traffic flows. By being located between the source and destination of the traffic (for example between the Internet and the user equipment), the QoS system 100 can further manipulate and reprioritize other traffic which is intended to optimize services like congestion management or radio resource management and many more.

Figure 6:
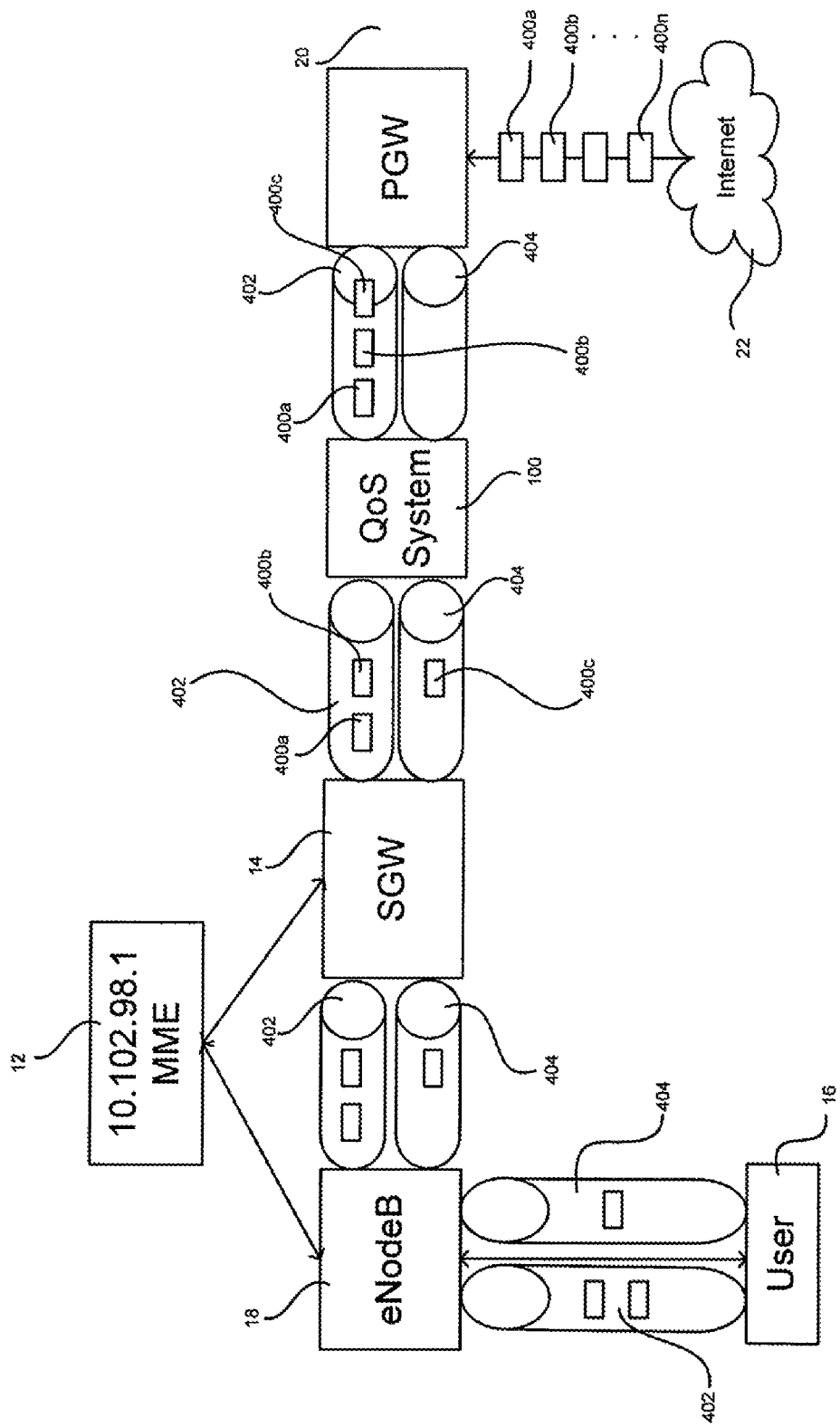
FIG. 6 illustrates yet another example of reprioritizing a traffic flow.

Yet another example is shown in FIG. 6. The traffic flow from the Internet 22 represented includes data packets 400a to 400n, some containing video packets a user intends to stream, while others may contain less quality sensitive material, for example instant messaging data. Conventionally, the PGW 20 is not able to detect what data is within the packets of the traffic flow and all packets 400 are sent to a default bearer 402. The QoS management system 100 received the packets 400 and the video packets 400c are detected. The QoS management system 100 manipulates the associated QoS parameters of the packets containing the video data, which moves the video packets 400c from the default bearer 402 to a dedicated bearer 404. The QoS may change the tunnel endpoint identification associated with the video packets 400c, which is intended to ensure that the packets remain associated with the dedicated bearer until they are received by the user via the user equipment 16.

Figure 7:
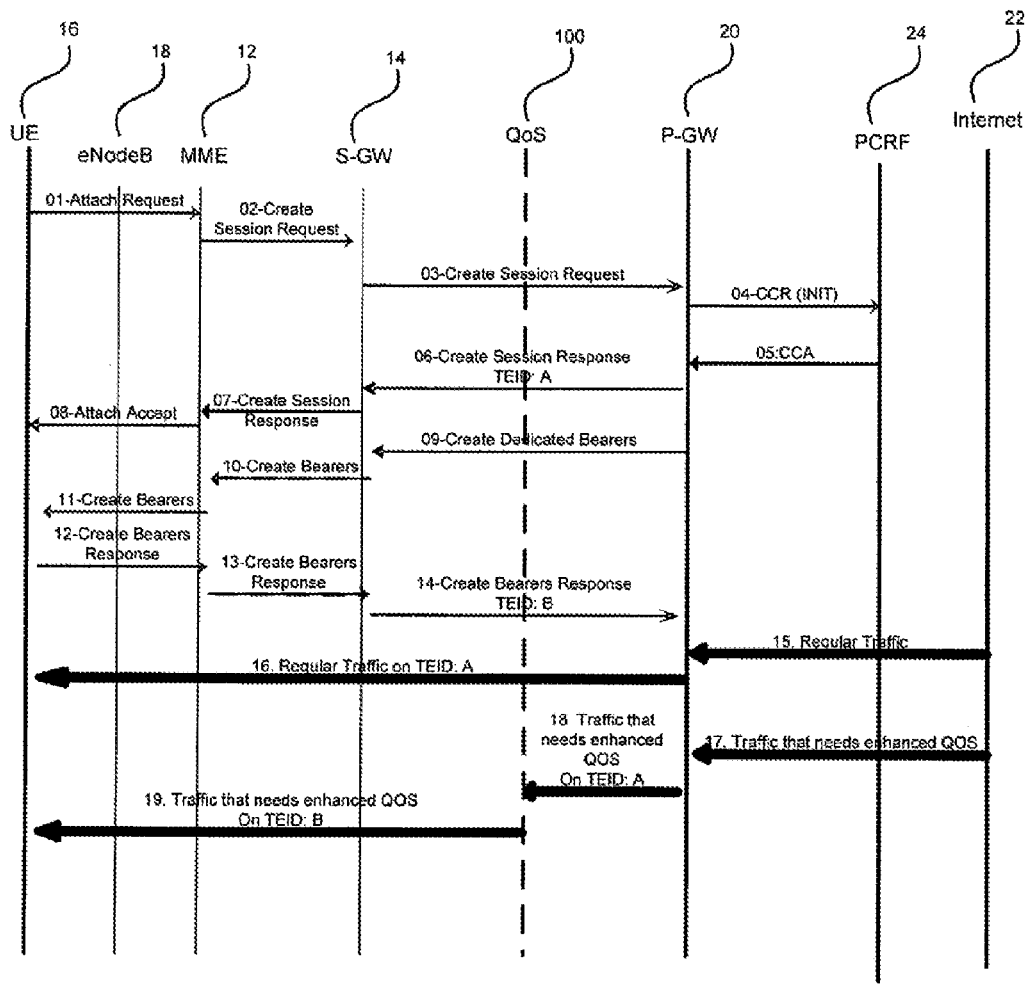
FIG. 7 illustrates an example of a network traffic flow.

The network flow diagram of FIG. 7 illustrates the traffic flow between the user equipment and the Internet. Between Steps 01-14, GTP-C messages are exchanged to setup the bearers to be used for the user session. First, an attach request is generated by the user equipment 16. The MME 12 receives the request and generates a create session request to the SGW 14. The SGW sends the create session request to the PGW 20. The request is reviewed and passed along by the QoS management system 100. The system 100 parses the message to retrieve QoS parameters such as the tunnel endpoint identification that are available to the user.

The PGW 20 may then send a diameter message Credit Control Request (CCR) to the PCRF node 24 to establish an IP-Conectivity Access Network (IP-CAN). The PCRF node 24 may reply to the PGW 20 with a Credit Control Answer (CCA) with policy and changing rules for enforcing the policy and changing the QoS parameters for a new bearer.

The PGW after receiving the CCA may send a create session response that the SGW 14 forwards the create session response to the MME 12, which creates an Attach accept message and sends the message to the user. The QoS management system 100 also receives and parses the create session response received from the PGW 20 prior to forwarding the response to the SGW 14. The QoS management system 100 may retrieve at least the following information: International Mobile Subscriber Identity (IMSI), Quality of Service Class Index (QCI) and Fully Qualified Tunnel Endpoint Identifier (F-TEID). During this phase, the QoS management system 100 stores the mapping between the TEID and the QCI for this user (subscriber).

The PGW 20 may further create a dedicated bearer message if such a bearer is within the subscriber's license agreement with the service provider. The SGW 14 forwards the create bearers message to the MME 12 which forwards the message to the user equipment 16. The user equipment 16 then issues a response that is sent to the MME 12 and forwarded to the SGW 14. The SGW 14 then sends the create bearer response to the PGW 20 which includes the TEID of the dedicated bearer.

After the bearers have been created, the QoS management system 100 will have created bearer map tables for the user sessions, which may include what TEIDs are available to the user. Traffic is then received from the Internet 22. The traffic flows through and is inspected by the system 100. Traffic that does not need to be reprioritized may be forwarded to the user equipment with the same QoS parameters and TEID. Traffic that may benefit from being reprioritized, either to enhance the QoS of a user or to reduce network congestion or the like may be further inspected and manipulated by the QoS management system 100. The need for the traffic to be reprioritized may not be detected by the PGW 20 using conventional 5 tuple method of review traffic. The traffic flow is inspected by the QoS system 100. When the QoS management system 100 determines that the traffic flow would benefit from being reprioritized, for example enhanced QoS is detected (based on parameters detected by the QoS system, for example the signature and other DPI techniques), the QoS management system 100 may modify the GTP-U message and replace the currently recorded TEID, with a different TEID used for different QoS parameters, for example, a change from a default bearer to a dedicated bearer. The QoS management system 100 can be configured to DSCP/TOS mark these packets following the same or a similar policy defined in the PGW. The traffic flow may then be sent to the user equipment using, for example, the dedicated bearer.

Figure 8:
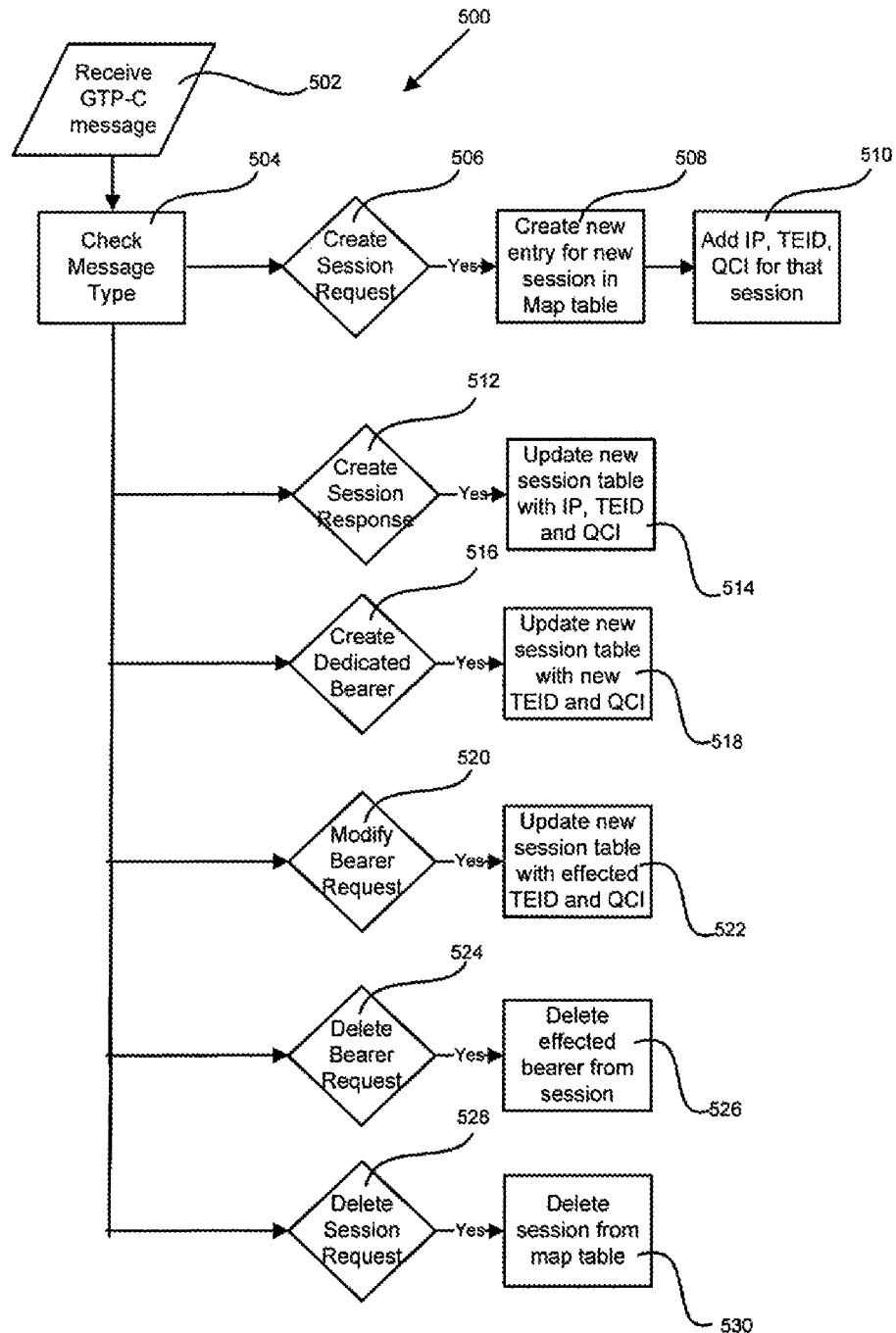
FIG. 8 is a flow chart of a method to build a bearer map table.

To implement the QoS management system 100, the bearer table builder module 112 is designed to build and maintain an accurate map or table per user of the existing bearers (tunnels), the TEID of each bearer (tunnel) and the bearer's associated QCI. An example method for building a bearer map table 500 is illustrated in FIG. 8. The QoS management module 110 receives a GTP-C message 502. The message type is checked 504 and sent to the GTP-C message parser 120 for parsing. If the message is a create session request 506, the create new session table sub-module 122 will create a new session table 508. The table will then be populated by the fields extracted by the GTP-C message parser 510, for example the IP, TEID and QCI for the created session.

If the message type is a create session response 512, the modify session table sub-module 124 will update the session table with the new or modified information 514. Similarly, if the message type is a create dedicated bearer 516 the modify session table sub-module 124 may update the session table with a new row identifying the information with respected to the dedicated bearer 518. The message type may further be a modify bearer request 520 wherein the modify session table sub-module may further modify the session table 522 with the modified information with respect to for example the TEID and/or QCI.

The message type may be a delete bearer request 524 in which case the modify session table sub-module 124 may further amend the bearer map table to remove the identified bearer from the bearer map table. The message may be determined to be a delete session request 528, in which case the delete session table sub-module 126 may delete the session in question from the map table 530.

A specific example is illustrated with reference to specific GTP-C messages below. When a GTP-C "CreateSessionRequest" message is received, the GTP-C message parser 120 will extract from this message at least the field to identify the subscriber such as the IMSI. Then the GTP-C may extract information per bearer, for example:

---

- F-TEID of Tunnel in the S5/S8 interface
- QCI: QoS Class Index

Create Session Request
    Flags: 72
    Message Type: Create Session Request (32)
    Message Length: 174
    Tunnel Endpoint Identifier: 0
    Sequence Number : 1
    Spare: 0
International Mobile Subscriber Identity (IMSI):
User Location Info (ULI) :
Serving Network :
RAT Type :
Indication :
Fully Qualified Tunnel Endpoint Identifier (F-TEID) :
Access Point Name (APN) :
Selection Mode :
PDN Type :
PDN Address Allocation (PAA) :
APN Restriction :
Aggregate Maximum Bit Rate (AMBR) :
Bearer Context : [Grouped IE]
    IE Type: Bearer Context (93)
    IE Length: 44
    000. .... = CR flag: 0
    .... 0000 = Instance: 0
        EPS Bearer ID (EBI) :
        Bearer Level Quality of Service (Bearer QOS) :
        IE Type: Bearer Level Quality of Service (Bearer QOS) (80)
        IE Length: 22
        000. .... = CR Flag: 0
        .... 0000 = Instance: 0
        .... ...0 = PVI (Pre-emption vulnerability): False
        ..00 01.. = PL (Priority Level): 1
        .0.. .... = PCI (Pre-emption Capability): False
        Label (QCI): 5.
        Maximum Bit Rate For Uplink: 1000000
        Maximum Bit Rate For Downlink: 1000000
        Guaranteed Bit Rate For Uplink: 0
        Guaranteed Bit Rate for Downlink: 0
    Fully Qualified Tunnel Endpoint Identifier (F-TEID) :
        IE Type: Fully Qualified Tunnel Endpoint Identifier (F-TEID) (87)

-continued

```
        IE Length: 9
        000. .... = CR flag: 0
        .... 0010 = Instance: 2
        1... .... = V4 (True-IPV4 address field Exists, False-Doesn't
        Exist in F-TEID): True
        .0.. .... = V6 (True-IPV6 address field Exists, False-Doesn't
        Exist in F-TEID): False
        ...0 0100 = Interface Type: S5/S8 SGW GTP-U interface (4)
        TEID/GRE Key: 2000000
        F-TEID IPV4: 10.106.98.3 (10.106.98.3)
```

The QoS management system 100 will update and append the Session Table according to other GTP-C messages (CreateSessionResponse, CreateBearerRequest, etc). The IP Address of the user (subscriber) may be extracted from the CreateSessionResponse as illustrated in below in this example.

```
GPRS Tunneling Protocol V2
Create Bearer Request
    Flags: 72
    Message Type: Create Bearer Request (95)
    Message Length: 77
    Tunnel Endpoint Identifier: 1000000
    Sequence Number: 78
    Spare: 0
    EPS Bearer ID (EBI) :
    Bearer Context : [Grouped IE]
        IE Type: Bearer Context (93)
        IE Length: 60
        000. .... = CR flag: 0
        .... 0000 = Instance: 0
        EPS Bearer ID (EBI) :
        EPS Bearer Level Traffic Flow Template (Bearer TFT) :
        Fully Qualified Tunnel Endpoint Identifier (F-TEID) :
        IE Type: Fully Qualified Tunnel Endpoint Identifier
        (F-TEID) (87)
        IE Length: 9
        000. .... = CR flag: 0
        .... 0001 = Instance: 1
        1... .... = V4 (True-IPV4 address field Exists, False-Doesn't
        Exist in F-TEID): True
        .0.. .... = V6 (True-IPV6 address field Exists, False-Doesn't
        Exist in F-TEID): False
        ...0 0101 = Interface Type: S5/S8 PGW GTP-U interface
        (5)
        TEID/GRE Key: 2000001
        F-TEID IPV4: 10.106.98.3 (10.106.98.3)
    Bearer Level Quality of Service (Bearer QOS) :
        IE Type: Bearer Level Quality of Service (Bearer QOS)
        (80)
        IE Length: 22
        000. .... = CR flag: 0
        .... 0000 = Instance: 0
        .... ...0 = PVI (Pre-emption vulnerability): False
        ..00 01.. = PL (Priority Level): 1
        .0.. .... = PCI (Pre-emption Capability): False
        Label QCI: 1
        Maximum Bit Rate For Uplink: 1000000
        Maximum Bit Rate For Downlink: 10000000
        Guaranteed Bit Rate For Uplink: 0
        Guaranteed Bit Rate For Downlink: 0
    Charging ID :
```

In this case, the subscriber has two bearers (one default and one dedicated), and at the session table will be created by the bearer table builder 112 that may resemble the table shown as Table 3.

TABLE 3

| UserID (IMSI) | IP | TEID | EBI | QCI |
|---|---|---|---|---|
| 425-01-1234563671 | 99.0.0.1 | 2000000 (default bearer) | 5 | 5 (non-GBR) |
| 425-01-1234563671 | 99.0.0.1 | 2000001 (dedicated bearer) | 6 | 1 (GBR) |

Figure 9:
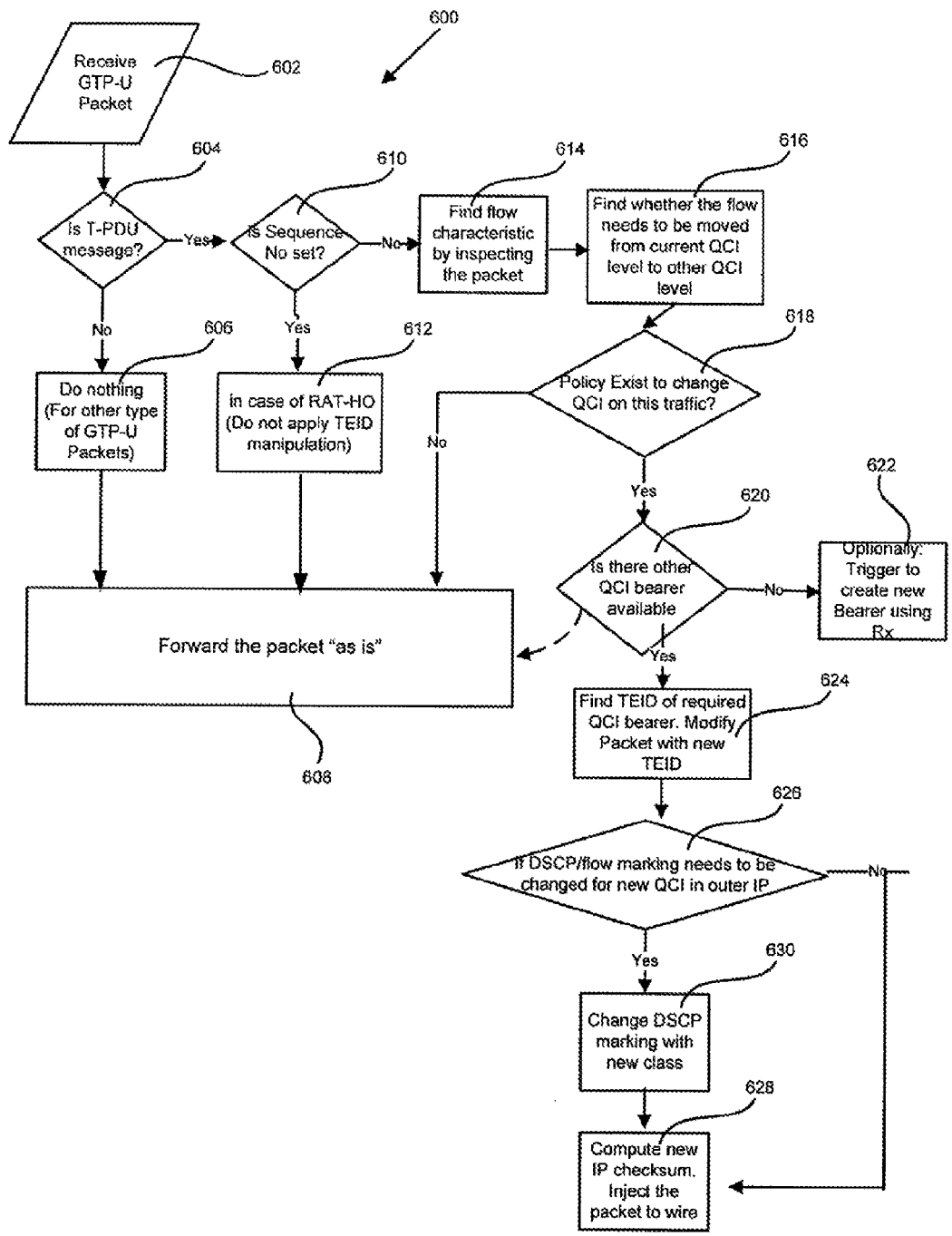
FIG. 9 is a flow chart of a method for QoS management.

FIG. 9 illustrates an example method of QoS management 600, and in particular, TEID management. The QoS management module 110 receives a GTP-U packet from the GTP-U specific handler 152. The message is reviewed to determine whether it is a transport protocol data unit (T-PDU) message 604. If it is not, the system 100 will ignore the message 606 and forward the packet as is 608, without any modification of the message's QoS parameters. If the message is a T-PDU message, the system 100 will review to see if the sequence number is set 610. If the sequence number is set and in the case of RAT-HO message, the packet will be forwarded as is 608.

The sequence number is an optional GTP-U header field. For GTP-U control messages, for example, echo request, echo-response, error-indication, supported extensions, header notification messages, a sequence number is used. But in payload message, for example, T-PDU, a sequence number is not used. However, when a G-PDU (T-PDU and header) is being relayed by the indirect data forwarding for Inter RAT HO procedure, sequence number may be used.

If the sequence number is not set then the packet will be inspected 614 by the payload packet inspector module 114 to determine flow characteristics. The flow characteristics will be reviewed to determine the current QCI level and other QCI levels available for the packet 616. Then the flow policy determination module 116 will determine whether there is a predetermined policy to change the QCI on the packet 618. If no policy exists, the packet will be forwarded as is 608. If there is a policy, the QoS system 100 will review the bearer map table and determine if there is another QCI bearer available 620. If there is no other QCI bearer available the packet may be forwarded as is 608 or optionally the system 100 may trigger a create bearer session to create a new bearer using Rx 622 as defined in further detail herein.

If another bearer is available, the system 100 may use the bearer map table sub-module to find the TEID of the bearer with the preferred QCI 624. The packet will be modified with the new TEID information by the TEID replacement sub-module 140. After changing the TEID, the DSCP and flow marking may be checked for the new QCI 626 by the DSCP recalculation sub-module 142. If no changes are needed the IP checksum calculation sub-module 144 will compute the new IP checksum then the IP packet injection sub-module 146, will feed the packet to the network 628. If changes are needed the DSCP recalculation sub-module 142 may update the packet with DSCP markings with new class information 630. Once the DSCP changes are done, the packet will be forwarded to the IP checksum calculation sub-module 144 for computing a new IP checksum prior to being injected back to the network by the IP packet injection sub-module 146.

The QoS management system 100 is intended to inspect the traffic continuously. The QoS management system 100 is also capable to look into the inner packet of a GTP-U message. As described earlier, GTP-U is a tunneling protocol, where the end user packets are encapsulated by a GTP-U header to be carried over the EPC network.

A specific example is shown below with reference to the GTP-U messages that may be received by the system 100. The specific example is intended to illustrate how the QoS management system 100 decides when to move traffic from one bearer to another bearer. For example, there may be predetermined policies that influence the QoS management system's decisions. In this case, there may be policy in the QoS system to move FTP traffic to bearer with QCI 1, for example: "IF Protocol=FTP THEN Move flow to Bearer with QCI=1"

When non-FTP traffic will be received the traffic will be forwarded "as is", without modification as shown below.

Internet Protocol, Src: 10.106.99.1 (10.106.99.1), Dst: 10.106.98.3 (10.106.98.3)
User Datagram Protocol, Src Port: 2152 (2152), Dst Port: 2152 (2152)
GPRS Tunneling Protocol
    Flags: 0x32
    Message Type: T-PDU (0xff)
    Length: 44
    TEID: 0x001e8480
    Sequence number: 0x0007
    N-PDU Number: 0x00
    Next extension header type: No more extension headers (0x00)
Internet Protocol, Src: 10.107.98.1 (10.107.98.1), Dst: 99.0.0.1 (99.0.0.1)
Transmission Control Protocol, Src Port: 80 (80), Dst Port: 2000 (2000), Seq: 231, Ack: 162, Len: 0
[Reassembled TCP Segments (230 bytes): #14 (115), #18(115), #22(0)]
Hypertext Transfer Protocol
    HTTP/1.1 200 OK\r\n
    Date: Mon, 25 Oct 2004 23:59:59 GMT\r\n
    Content-Type: text /html\r\n
    \r\n
Line-based text data: text/html When FTP traffic will be detected, the QoS system will check the current TEID (0x001e8480=2000000).

Internet Protocol, Src: 10.106.99.1 (10.106.99.1), Dst: 10.106.98.3 (10.106.98.3)
User Datagram Protocol, Src Port: 2152 (2152), Dst Port: 2152 (2152)
GPRS Tunneling Protocol
    Flags: 0x32
    Message Type: T-PDU (0xff)
    Length: 122
    TEID: 0x001e8480
    Sequence number: 0x0000
    N-PDU Number: 0x00
    Next extension header type: No more extension headers (0x00)
Internet Protocol, Src: 10.107.98.1 (10.107.98.1), Dst: 99.0.0.1 (99.0.0.1)
Transmission Control Protocol, Src Port: 20 (20), Dst Port: 2000 (2000), Seq: 1, Ack: 1, Len: 78
FTP Data If TEID's QCI is different than 1, then the QoS management system will lookup for the TEID corresponding to the QCI:1 and will get the 2000001 value. The QoS management system will replace the TEID number by the TEID with QCI 1 and will forward the packet along the network.

Internet Protocol, Src: 10.106.99.1 (10.106.99.1), Dst: 10.106.98.3 (10.106.98.3)
User Datagram Protocol, Src Port: 2152 (2152), Dst Port: 2152 (2152)
GPRS Tunneling Protocol
    Flags: 0x32
    Message Type: T-PDU (0xff)
    Length: 122
    TEID: 0x001e8481
    Sequence number: 0x0000
    N-PDU Number: 0x00
    Next extension header type: No more extension headers (0x00)
Internet Protocol, Src: 10.107.98.1 (10.107.98.1), Dst: 99.0.0.1 (99.0.0.1)
Transmission Control Protocol, Src Port: 20 (20), Dst Port: 2000 (2000), Seq: 1, Ack: 1, Len: 78
FTP Data From there, the SGW, eNodeB will consider this packet as part of the dedicated bearer (QCI 1) and will provide the specified QoS. Other scenarios may follow similar methods but may be related to different policies. Policies are generally created by the network operator. Policies may review policy conditions such as network congestions, usage, volume, rate, subscriber information, physical location, date and time, and other information to achieve the goals of the network operator. Depending on the determined policies and based on the policy conditions in addition to the application level protocol and QoS parameters, the QoS management system then is able to determine which traffic flows should receive increased or decreased priorities. Policies may be pre-determined and preloaded into the system or may be loaded or updated by the network operator through a user interface operatively connected to the QoS management system.

Figure 10:
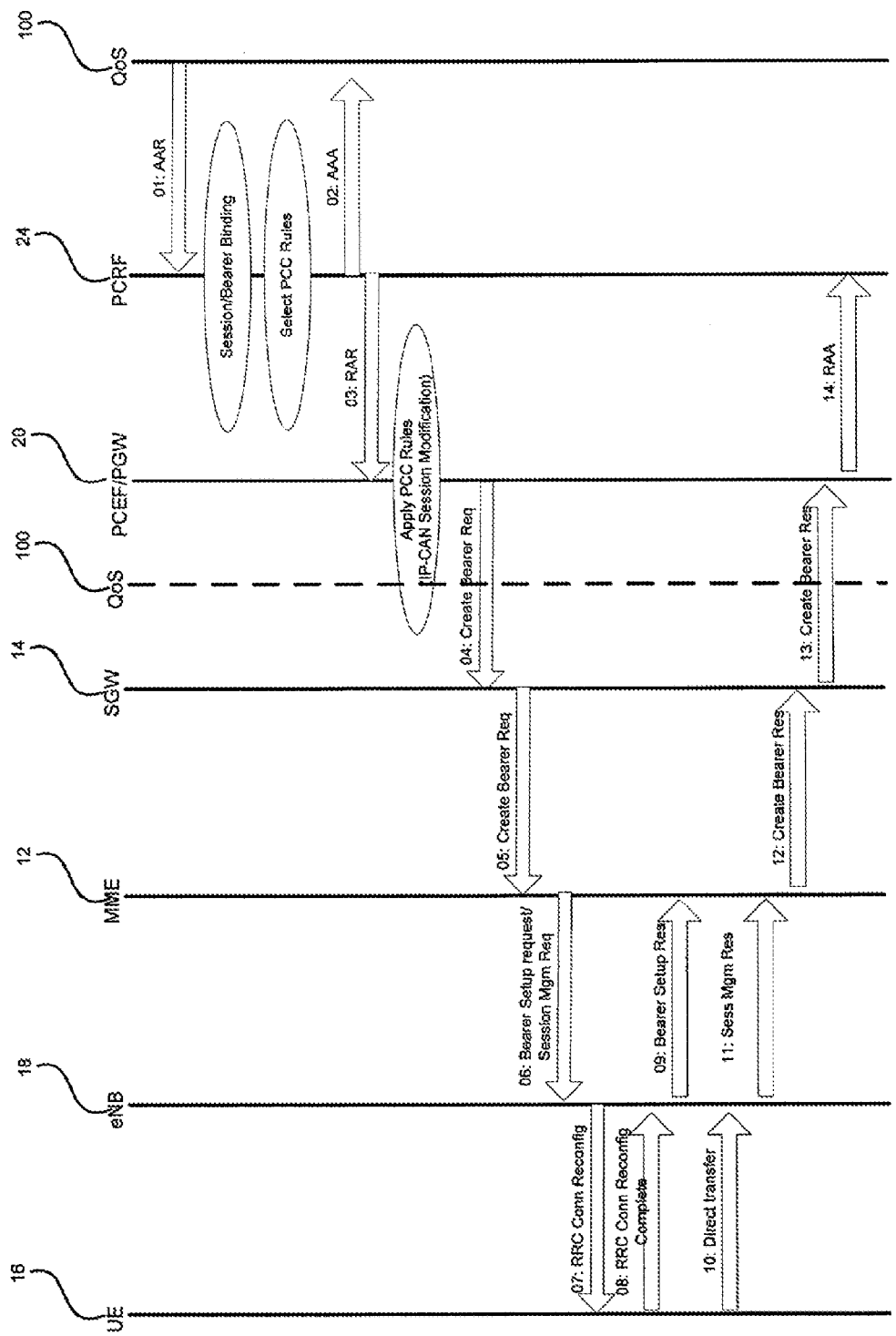
FIG. 10 illustrates an example method for dedicated bearer creation.

FIG. 10 illustrates a network flow diagram of a method for creating a dedicated bearer. The dedicated bearer may be created by the QoS management system 100 when the system acts as an application server. The QoS management system can request new bearer creation by contacting the PCRF. The PCRF after policy evaluation will enforce the bearer creation on the network (PCEF). This newly created bearer will serve for subsequent traffic in the traffic flow. The current traffic will act as a trigger to create the new bearers, but it will not be possible to hold the traffic until the new bearers are created and the traffic will be forwarded as is, as described herein, until a new bearer is created. The network flow in FIG. 10 illustrates an example method to create the bearer. The QoS system is shown in a location for ease of flow, and the physical location may be between the SGW 14 and PGW 20 as shown by the dotted representation.

Upon receiving an internal trigger, to create a dedicated bearer with required QoS parameters, the QoS system 100 sends diameter message authentication authorization request (AAR) to the PCRF 24. The AAR message may contain the service information needed, such as media type, media format, flow description, priority indication etc. The PCRF 24 identifies the corresponding IP-CAN session, and binds the message with the session. The PCRF 24 further selects the Policy and changing rules, which are to be enforced by the PCRF 24. The PCRF responses with an authentication authorization answer (AAA) to the QoS System 100. The PCRF 24 further sends Re-Auth Request (RAR) to the PCEF, within the PGW node 20, as part of IP-CAN Session modification. The PCEF sends a Create bearer Request to the SGW 14, to create new dedicated bearer for the system is then able to retrieve and determine the TEID of new dedicated bearer.

The SGW 14 forwards this message to the MME 12. The MME sends a NAS messages Session Management Request with Bearer Setup Request to the eNodeB 18. The eNodeB 18 sends RRC connection Reconfigure RAN message to the user equipment 16. The user equipment 16 responses of RRC connection reconfigure. Further the eNodeB 18 sends a bearer setup response to MME 12. The user equipment 16 sends direct transfer message to the eNodeB 18. The eNodeB 18 sends a session management response to the MME 12. The MME 12 then sends Create Bearer Response to the SGW 14. The QoS system 100 examines or parses this Create Bearer Response message to build bearer map table. The SGW 14 forwards the Create Bearer Response to the PGW 20. The PGW 20 then sends Re-Auth Answer (RAA) to the PCRF 24. Once the dedicated bearer is created, the QoS system may amend the priority on subsequent traffic flows with the appropriate QoS parameters matching the parameters of the new dedicated bearer.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for managing quality of service (QoS) for a traffic flow within a network comprising:
   receiving a packet encapsulated by a tunneling header, at a node in the network between end points of the traffic flow;
   inspecting a tunneling protocol within the tunneling header to identify at least one application level characteristic of the packet and a data type of the packet;
   manipulating QoS parameters associated with the packet based on the application level characteristic and the data type;
   accessing a bearer map table to determine whether there is an available bearer with the manipulated QoS parameters wherein, determining whether there is an available bearer comprises determining the tunnel endpoint identification (TEID), quality of service parameters and QoS class index (QCI) associated with each bearer in the bearer map table;
   if there is an available bearer, designating the available bearer as a new bearer for the packet;
   if there is no available bearer, creating a new bearer with the manipulated QoS parameters and designating it a new bearer for the packet;
   storing the bearer map table with the quality of service parameters and a mapping between a TEID and a QCI of the new bearer;
   modifying the TEID of the tunneling header of the packet based on the new bearer in order to move the packet to the new bearer; and
   sending the packet to a destination using the new bearer for the packet.

2. A method for managing quality of service of claim 1 wherein modifying the tunneling header of the packet further comprises recalculating the Differentiated Services Code Point (DSCP) of the packet.

3. A method for managing quality of service of claim 1 further comprising creating the bearer table by determining available bearers from the traffic flow.

4. A method for managing quality of service of claim 1 further comprising:
   identifying a set of quality of service policies available for the packet;
   identifying policy conditions for the packet based on the set of available service policies;
   further modifying the quality of service parameters of the packet based on the identified policy conditions; and
   sending the packet to the destination with the further modified quality of service parameters.

5. A method for managing quality of service of claim 1 wherein identifying the at least one application level characteristic of the packet comprises deep packet inspection (DPI).

6. A method for managing quality of service of claim 1 further comprising determining type of data within the packet after identifying the at least one application level characteristic.

7. A method for managing quality of service of claim 1 wherein the packet is transmitted using General Packet Radio Services Tunneling Protocol (GTP).

8. A method for managing quality of service of claim 1 further comprising determining a tier of service of the user, and wherein modifying the quality of service parameters comprises reprioritizing the packet based on the tier of service of the user.

9. A method for managing quality of service of claim 1 wherein the quality of service parameters are modified without altering General Packet Radio Service Tunneling Protocol-Control (GTP-C) messages.

10. A system for managing quality of service (QoS) within a network, the system located at a node in the network between end points of traffic flows in the network comprising:
    a bearer module adapted to review and retrieve data from a packet in a traffic flow, wherein the packet is encapsulated by a tunneling header;
    a payload packet inspector module adapted to inspect a tunneling protocol within the tunneling header and to identify at least one application level characteristic of the packet and a data type of the packet;
    a policy enforcement module adapted to manipulate QoS parameters associated with the packet based on the at least one application level characteristic and the data type;
    a flow policy determination module configured to access a bearer map table to determine whether there is an available bearer with the manipulated QoS parameters,
    wherein determining whether there is an available bearer comprises determining the tunnel endpoint identification (TEID), QoS parameters and QoS class index (QCI) associated with the bearer, and if there is an available bearer, designating the available bearer as a new bearer for the packet but if there is no available bearer, trigger a new bearer creation with the manipulated QoS parameters and designating it a new bearer for the packet;
    storing the bearer map table with the quality of service parameters and a mapping between a TEID and a QCI of the new bearer;
    modifying the TEID of the tunneling header of the packet based on the new bearer in order to move the packet to the new bearer;
    sending the packet to a destination using the new bearer for the packet; and
    a processor configured to execute the instructions of the system modules.

11. A system for managing quality of service of claim 10 wherein the flow policy determination module determines if a policy is applicable to the packet.

12. A system for managing quality of service of claim 10 wherein the bearer module comprises a General Packet Radio Service Tunneling Protocol-Control (GTP-C) message parsing sub-module adapted to parse and detect QoS parameters and user information from a GTP-C message.

13. A system for managing quality of service of claim 12 wherein the bearer module further comprises a create new session table sub-module designed to create a new session bearer map table for a subscriber with the QoS elements and subscriber information retrieved by the GTP-C message parsing sub-module.

14. A system for managing quality of service of claim 13 wherein the bearer module further comprises a modify session table sub-module adapted to modify the session bearer map table with amended user information.

15. A system for managing quality of service of claim 10 wherein the policy enforcement module further comprises a Differentiated Services Code Point (DSCP) recalculation sub-module to recalculate the DSCP of the packet.

16. A system for managing quality of service of claim 10 wherein modifying the quality of service parameters comprises reprioritizing the packet based on a tier of service of the user.

17. A system for managing quality of service of claim 10 wherein the quality of service parameters are modified without altering General Packet Radio Service Tunneling Protocol-Control (GTP-C) messages.

* * * * *